Aug. 4, 1959  L. J. NEID  2,897,627
BIRD TRAP
Filed March 3, 1955

INVENTOR
LOUIS J. NEID
BY Williamson, Schroeder,
Adams & Meyer ATTORNEYS

United States Patent Office 2,897,627
Patented Aug. 4, 1959

2,897,627

BIRD TRAP

Louis J. Neid, St. Paul, Minn.; Pauline E. Neid executrix of said Louis J. Neid, deceased Application March 3, 1955, Serial No. 491,830

2 Claims. (Cl. 43—65)

This invention relates to bird traps, and has for an important object the provision of a bird trap which will quickly and efficiently trap wild birds, particularly those classed as pests.

It is another object of the invention to provide a bird trap which will not require swinging doors and gates but will rely merely upon an open door structure through a bird-retaining wall of the trap, so fashioned and positioned as to permit easy entrance of birds but prevent their return.

It is a further object of the invention to provide a bird trap which has inwardly converging wall structure which terminates in a doorway through which birds may easily enter with wings in folded condition, but which requires extended wings in order for the bird to return to the doorway, the doorway opening having such dimension as not to accommodate the wings of the bird in flight.

It is a still further object of the invention to provide a bird trap in which the trap doorway can be adapted to selectively trap birds of several different species depending upon their respective sizes and wing spreads.

These and other objects and advantages of my invention will more fully appear from the following description made in connection with the accompanying drawings wherein like reference characters refer to the same parts throughout the several views and in which.

Figure 1:
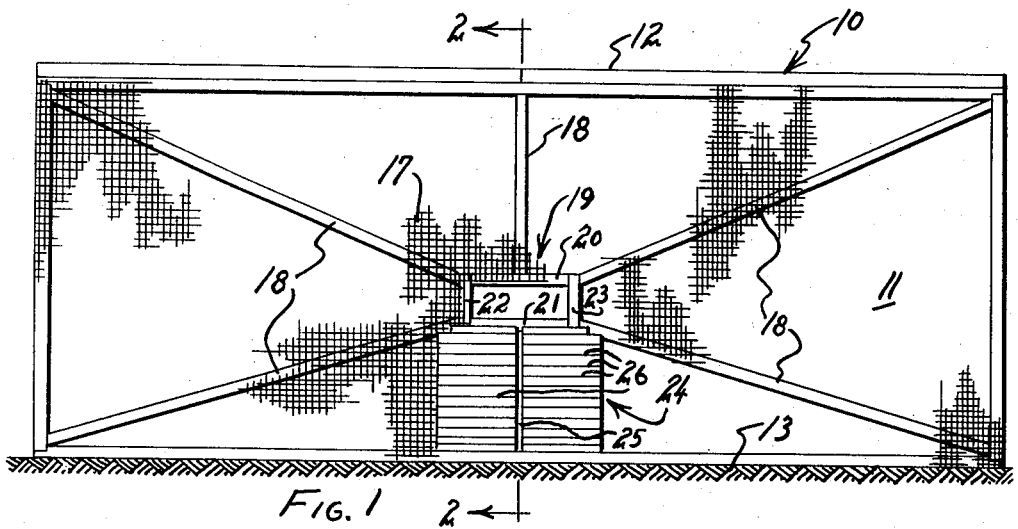
Fig. 1 is a front elevation of a bird trap embodying my invention and showing the wall structure thereof.
Figure 2:
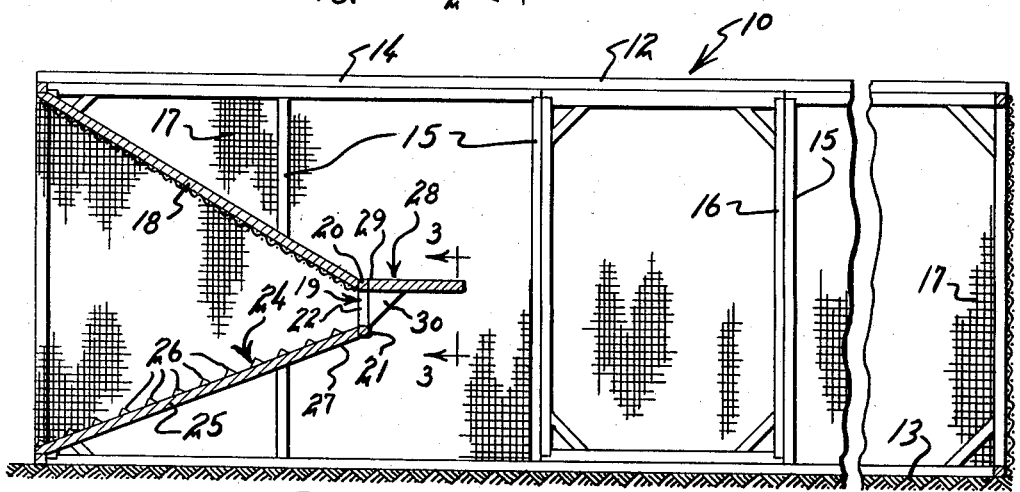
Fig. 2 is a vertical section taken on the line 2—2 of Fig. 1 of my bird trap, intermediate portions thereof being segmented.

With continued reference to the drawing, my bird trap contemplates a frame construction which may range from small portable size up to a dimension which will permit a man to enter the structure. The frame construction defines a bird-retaining enclosure designated generally by the number 10 and having side wall structure 11, a ceiling 12 and a bottom 13, as shown in Figs. 1 and 2. The enclosure may be formed by edge framing members 14 and by studs or braces 15 placed at suitable intervals about the enclosure. An access door 16 may be hingedly mounted at one side of the enclosure 10, particularly where the trap is of such a size as to permit a man to enter.

The framework of enclosure 10 is preferably covered with a mesh material 17 which is of such construction as to permit air and light to easily pass therethrough, but the individual openings of which are smaller than the size of the individual birds which it is intended to trap within the enclosure. I have found that chicken wire or other mesh construction may be usefully employed in forming my bird trap-retaining enclosure.

My invention particularly concerns the side wall structure of a trap adapted to catch a wide variety of birds among which are scrub pigeons, starlings, sparrows and the like. In the instant case, one of the walls is shown in Fig. 1 containing my special trapping means, but it is understood that any or all of the walls may have one or more of such trapping means which will permit a bird to enter into the enclosure, but prevent its return.

Referring more particularly to Fig. 1, the wall structure is shaped so as to present inwardly converging framing members 18 which may, in turn, be covered with the mesh or netting 17, as employed in the remaining wall and ceiling structure of the trap. The converging frame members 18, together with the screen or mesh covering, defines a funnel which terminates inwardly in a framed opening 19 which, in the instant case, is formed in a rectangular manner with the horizontal dimension of the opening greater than the vertical. The opening or passageway 19 has, in its framing construction, an upper edge 20, a lower edge 21, and side edges 22 and 23 respectively. It will be noted that the opening or passageway 19 is located at a position intermediate the floor 13 and the ceiling 14, as shown in Fig. 2.

A walking surface 24 may be provided at the external side of the wall structure 11 and preferably constitutes a ramp of solid base structure 25 having small cleats or steps 26 formed thereon to assist a bird in climbing the ramp and also for holding food such as grain for bait to entice a bird upwardly from the ramp structure. The inward edge 27 of ramp 24 terminates substantially at the lower edge 21 of the framed opening or passageway 19, as shown in Fig. 2.

Associated with the inside of the enclosure is a baffle or canopy 28 which is preferably plane and horizontal and has its outward edge 29 terminating substantially at the upper edge 20 of the framed opening 19. It is preferred that a side baffle 30 be positioned at each of the side edges 22 and 23 respectively of the framed opening 19 and with each extending upwardly to join the baffle or canopy 28, as shown in Fig. 2.

Figure 3:
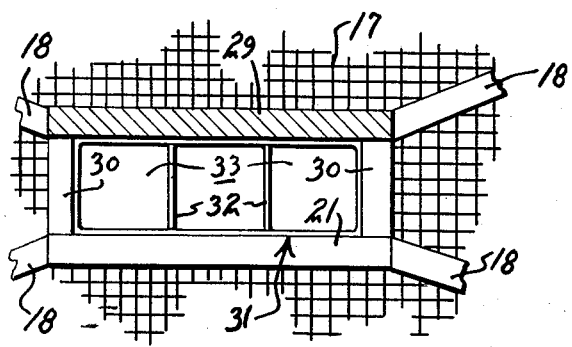
Fig. 3 is an enlarged detail of a wall fragment surrounding the doorway showing a partitioned frame added to the door opening and taken on the line 3—3 of Fig. 2.

I have found it useful to employ a divider means shown generally at 31 in Fig. 3 so as to increase the versatility of the bird trap. The divider means is provided with one or more vertical struts 32 in spaced relation so as to create openings 33 in horizontal sequence across the framed opening 19. It will be noted that the divider means 31 does not substantially vary the height of the opening 19, but divides the length thereof into substantially smaller and sub-divided dimension.

In the use and operation of my bird trap, decoys and bait (not shown) may be spread at the bottom and around the retaining enclosure 10 and bait may further be spread upon ramp 24 to assist in enticing birds up to the framed opening 19. When a bird reaches the opening, he can easily perch on the lower edge 21 of framed opening 19 and get his entire body with wings closed into the opening. He can further jump down from the perch to the floor 13 without any difficulty whatsoever. Now, however, if he attempts to return, his wings will strike the downwardly facing surface of the canopy or baffle 28 and prevent him from attaining a level sufficient to grasp the perch 21 with his claws. Furthermore, the width of the opening may be selected, either by total dimension or by means of the divider structure shown in Fig. 3 so as to cause the wings of a bird in fluttering flight to strike against the vertical struts or side edges and thereby prevent the bird from flying directly through the framed opening 19. It is understood, of course, that the framed opening with or without the divider means, will be so dimensioned that the particular class of birds which it is desired to trap will be capable of easily entering the passageway or opening with wings folded, but will not be able to get out from the enclosure since there is no return ramp and since there is no clearance for fluttering to a perch or past the vertical side members. Large quantities of birds may be trapped in my bird-retaining enclosure, and those which have found their way inside the trap will function to attract other birds through the framed opening.

It may thus be seen that I have devised a simple and effective bird trap which does not rely upon swinging door or pin members and yet which, by virtue of rigid structure, in conjunction with the natural habits of a bird, constitutes an efficient trap for various classes of birds.

It will, of course, be understood that various changes may be made in the form, detail, arrangement and proportion of the parts without departing from the scope of my invention.

What I claim is:

1. A bird trap comprising, a bird-retaining enclosure having a ceiling, a floor and a side wall structure, said side wall structure having a framed opening intermediate the ceiling and floor and of a size sufficient to permit a bird with closed wings to pass therethrough, but of insufficient size to permit the same bird to fly therethrough, a walking surface mounted externally of said opening and terminating inwardly substantially at the lower edge of said opening, a horizontal baffle having a downwardly facing wing-guarding surface mounted internally of said opening and terminating outwardly substantially at the upper edge of said opening, and an upright baffle surface disposed at each side of said framed opening and extending inwardly to underlie said horizontal baffle whereby to prevent birds which have entered said enclosure from flying through the opening or from alighting in flight upon the lower edge of the framed opening.

2. A bird trap comprising, a bird-retaining enclosure having a ceiling, a floor and a side wall structure, said side wall structure having a framed opening intermediate the ceiling and floor and of a size sufficient to permit a bird with closed wings to pass therethrough, but of insufficient size to permit the same bird to fly therethrough, a walking surface mounted externally of said opening and terminating inwardly substantially at the lower edge of said opening, a baffle having an outermost edge horizontally secured substantially along the upper edge of said opening and having a downwardly facing surface extending inwardly of the enclosure to provide a height-restricting canopy for a bird flying therebeneath, and a pair of horizontally spaced baffle members mounted at the respective side edges of said opening and lying inwardly of the enclosure and beneath the canopy baffle to provide a width-restricting means whereby to prevent birds which have entered said enclosure from flying through said opening or from alighting in flight upon the lower edge of the framed opening.

References Cited in the file of this patent

UNITED STATES PATENTS

| | | |
|---|---|---|
| 171,673 | Littlefield | Jan. 4, 1876 |
| 521,053 | Seaton | June 5, 1894 |
| 744,903 | Cahoon | Nov. 24, 1903 |
| 1,169,409 | Larson | Jan. 25, 1916 |
| 1,209,993 | Oettinger | Dec. 26, 1916 |
| 1,361,417 | Teasdale | Dec. 7, 1920 |
| 1,509,874 | Pelyp | Sept. 30, 1924 |
| 1,936,644 | Schroder | Nov. 28, 1933 |